FIP8102 XR 2,855,456

1,T-2423

1X5 2206

X5464T

X-1116

Oct. 7, 1958 W. C. MORRISON 2,855,456

FREQUENCY CONVERSION SYSTEM

Filed March 8, 1954 2 Sheets-Sheet 1

INVENTOR.
WENDELL C. MORRISON
BY [signature]
ATTORNEY

2855456
OR IN 358/10

Oct. 7, 1958 W. C. MORRISON 2,855,456

FREQUENCY CONVERSION SYSTEM

Filed March 8, 1954 2 Sheets-Sheet 2

INVENTOR.
WENDELL C. MORRISON

BY [signature]

ATTORNEY

United States Patent Office 2,855,456

Patented Oct. 7, 1958

2,855,456

FREQUENCY CONVERSION SYSTEM

Wendell C. Morrison, Princeton, N. J., assignor to Radio Corporation of America, a corporation of Delaware Application March 8, 1954, Serial No. 414,800

5 Claims. (Cl. 178—5.4)

This invention relates to frequency conversion systems and more particularly to an improved arrangement for a stable frequency conversion system in which a predetermined relationship is maintained between the frequency of an input electrical wave and the frequency of the output electrical wave.

A possible source of interference in a color television receiver is created by an electrical wave resulting from the mixture of electrical signals of a color subcarrier frequency and a sound carrier frequency to produce spurious visual patterns on the viewing screen of a television receiver. The extent of this interference can be minimized by causing the signals to interlace in the scanning pattern of the television picture. Interlace can be accomplished by maintaining the frequency difference between the color subcarrier and sound carrier equal to an odd multiple of half line frequency. The frequency difference between the color subcarrier and the sound carrier may be maintained at an odd multiple of half line frequency by properly selecting and making stable the color subcarrier frequency and then establishing a constant difference between the picture carrier and the sound carrier or sound center frequency. There is a need, therefore, for a reliable device for comparing the frequency difference or beat frequency between the picture carrier and sound center frequency with a standard frequency.

In such frequency comparing devices it is necessary to have available a signal of substantially unvarying frequency for comparison purposes. Standard frequency signals having a high degree of carrier frequency stability are regularly broadcast by the National Bureau of Standards Radio Station WWV, and various systems have been devised to make the signals available for reference purposes. Station WWV broadcasts a substantially unvarying frequency signal which provides a satisfactory standard with which to compare the beat frequency signal produced between the picture carrier and the sound center frequency. Various systems have been devised for receiving and utilizing a signal of high frequency stability without appreciably decreasing the stability of the signal.

In such systems, generally, oscillations of an electrical wave are mixed with electrical oscillations of a wave which is locally provided, resulting in a lower frequency wave which can be more readily amplified. This electrical wave of lower frequency is amplified and then mixed with another locally provided electrical wave to produce an output electrical wave having a frequency different from the frequency of the original wave. This frequency difference serves to prevent regeneration or feedback coupling between the input and output circuits of the system. If the output and input electrical wave frequencies were similar the output from the system could create a feedback into the system and instability would result.

In frequency conversion systems of the type referred to above, stability of frequency is extremely important. Frequency deviation of a local oscillator may create frequency deviation in the oscillations of the electrical wave to be utilized and for that reason various forms of frequency conversion systems have been devised in which the frequency of the local oscillators is controlled or stabilized.

The present invention, in its more general form, contemplates the use of a local oscillator to provide electrical wave oscillations which are to be mixed with electrical wave oscillations of an input wave for example, the received carrier of WWV, to provide a difference frequency signal wave. Difference frequency electrical wave oscillations resulting from the mixture of the input wave and the electrical wave from the local oscillator are amplified and are then multiplied in frequency by a predetermined number. The signal oscillations resulting from the frequency multiplication are then mixed with electrical oscillations from the same local oscillator but which have also been multiplied in frequency by the same abovementioned predetermined number. By selecting the proper resultant of the second mixing, the frequency of the local oscillator is effectively both added to and subtracted from the frequency of the amplified wave. Therefore, any frequency variations of the local oscillator are cancelled and create no error in the final resultant electrical wave.

It is, therefore, an object of the present invention to provide an improved frequency conversion system.

Another object of this invention is to provide an improved method of converting the frequencies of various electrical waves in order that the waves may be amplified with a high degree of frequency stability.

A further object of this invention is to provide an amplifier having improved selectivity and frequency stability.

A further object of this invention is to provide an improved color television testing system.

Other and incidental objects of the invention will be apparent to those skilled in the art from reading the following specification and on inspection of the accompanying drawing, in which.

Figure 1:
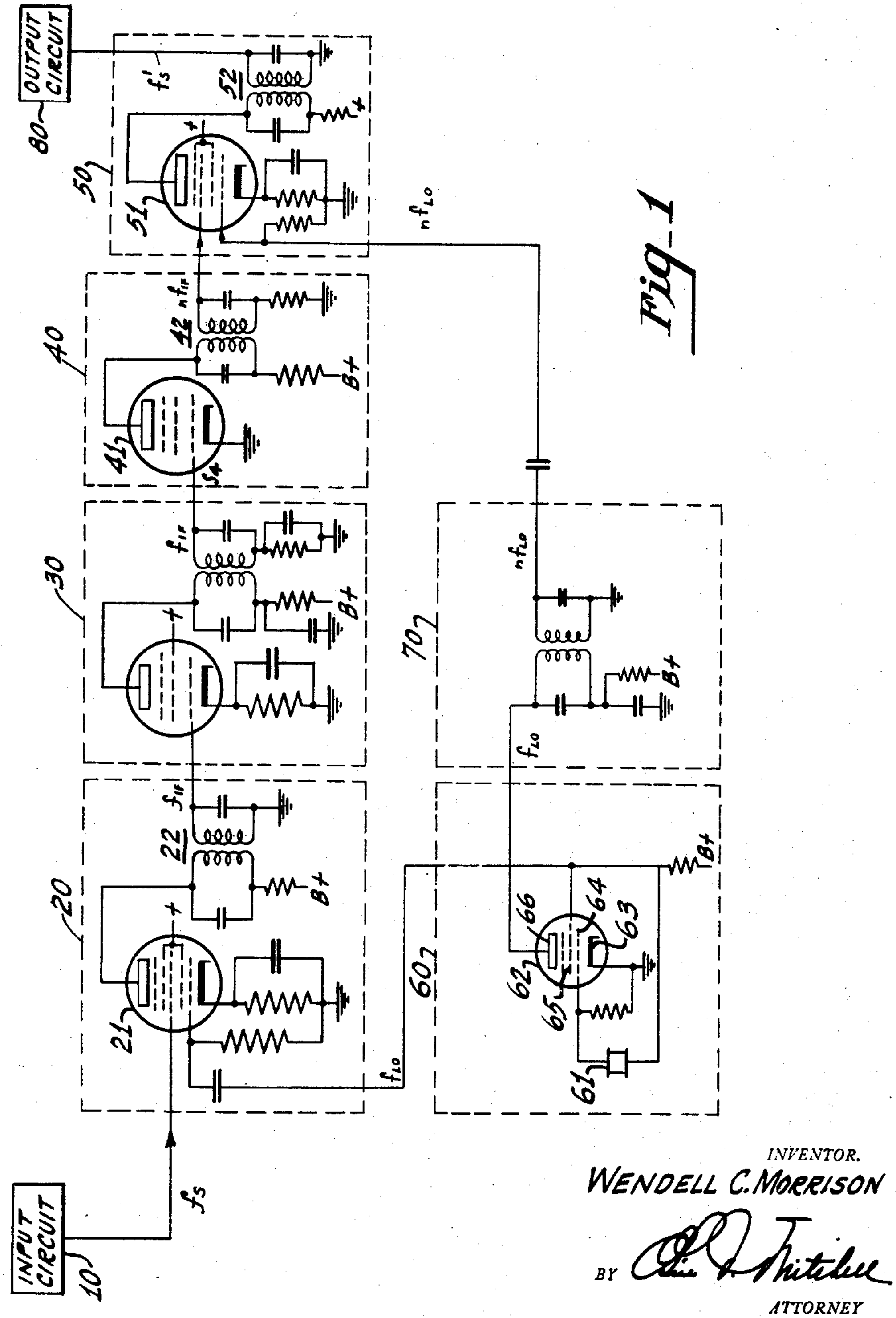
Figure 1 is a diagrammatic showing of one form of this invention.

In Figure 1, the following symbols will be used throughout as an aid in explaining the operation of the invention:

$f_s$=input signal frequency
$f_{lo}$=local oscillator frequency
$f_{if}$=intermediate or difference frequency
$n$=any number
$nf_s=f'_s$=output frequency.

In Figure 1 there is shown a block 10, representing a signal input circuit having the necessary circuitry to receive an input signal of a particular frequency $f_s$ and signal to a mixer circuit 20, having a pentagrid mixer tube 21, and a resonant load circuit 22, tuned to frequency $f_{if}$. The pentagrid mixer tube 21 has its control grid connected to a local oscillator circuit 60, which generates an electrical wave of substantially constant frequency $f_{lo}$. The connection between the signal input circuit 10 and the pentagrid mixer tube 21 is made to a grid of the mixer tube 21 in order to modulate an electron stream produced in the tube 21. The local oscillator circuit 60 has an oscillator tube 62, excited by a crystal 61, which has an inherently high stability. The lower portion of the tube 62 consisting of a cathode 63, a control grid 64, and a screen grid 65, serves as the oscillator tube, while the upper portion of the tube consisting of a plate 66 acting in conjunction with the cathode 63, the control grid 64 and the screen grid 65 serves as an amplifier, there is thus formed a crystal controlled electron coupled oscillator circuit. The output of the mixer 21 contains frequencies $f_s$, $f_{lo}$, $(f_{lo}+f_s)$, and $(f_{lo}-f_s)$. The load circuit 22 is resonant at $f_{if}$, which in this case, is chosen to be equal to $f_{lo}-f_s$. Thus all signals except $f_{if}=f_{lo}-f_s$ are eliminated. The signal $f_{if}$ is applied to the grid of an amplifier circuit 30, in which the signal is amplified to a desired magnitude. The output of amplifier circuit 30 is in turn connected to a signal frequency multiplying circuit 40 having a vacuum tube 41, the output of which is rich in harmonics, and a resonant load circuit 42 tuned to a multiple of $f_{if}$. This multiplying circuit 40 acts to multiply the electrical waves of frequency $f_{if}$ by a factor $n$ to produce electrical waves of frequency $nf_{if}$. The waves of frequency $nf_{if}$ are then fed to a second mixer circuit 50 which has a pentagrid mixer tube 51 and a resonant load circuit 52 tuned to frequency $nf_{lo}-nf_{if}$. Oscillator frequency multiplying circuit 70 is connected to receive electrical wave energy from the local oscillator circuit 60 of a frequency $f_{lo}$. The frequency multiplying circuit 70 multiplies the frequency of the wave energy it receives by the same factor $n$ to give an electrical wave of frequency $nf_{lo}$, which is fed to the pentagrid mixer circuit 50, where it is combined with electrical waves of a frequency $nf_{if}$. Similar to the operation in mixer 21, the output of mixer 51 contains signals of frequency $nf_{if}$, $nf_{lo}$, $(nf_{lo}+nf_{if})$ and $(nf_{lo}-nf_{if})$. But due to the resonant condition of load circuit 52, all frequencies except $(nf_{lo}-nf_{if})$ are eliminated. Frequency $(nf_{lo}-nf_{if})=n(f_{lo}-f_{if})$, which is also equal to the input signal frequency times $n$, or $nf_s=f'_s$, which is fed to an output circuit 80 for utilization.

It will be noted that in the foregoing explanation, $f_{lo}$ must be a higher value than $f_s$ in order for $(f_{lo}-f_s)$ to yield $f_{if}$. Also, with this combination of frequencies, the output $f'_s=nf_s=n(f_{lo}-f_{if})$. It is therefore well known by those skilled in the art, that the reverse combination is also possible, in which $f_s$ may be greater than $f_{lo}$. In this event, $(f_s-f_{lo})=f_{if}$, *and* $f'_s=nf_s=n(f_{lo}+f_{if})$. By way of a specific example in explaining the operation of the device shown in Figure 1, assume that the input circuit 10 is tuned to receive the 2.5 megacycle carrier signal from WWV. $F_s$ is therefor 2.5 megacycles. Let us also for example choose the frequency of the crystal 61 to be 2.96 megacycles making $f_{lo}$ 2.96 megacycles. Due to the heterodyne action in mixer 20, $f_{if}$ will be $(f_{lo}-f_s)$, which is equal to 460 kilocycles. This 460 kc. signal is amplified in amplifier 30 and frequency multiplied in multiplier 40 by a factor of 2, for example and therefore in this case $n$ equals 2. The signal frequency out of bandpass circuit 32 is therefore 920 kilocycles. Since $f_{lo}$ is 2.960 megacycles and $n=2$, the frequency of the signal out of frequency multiplier 70 will be 5.92 megacycles or 5,920 kilocycles. When the 920 kc. signal from multiplier 40 and the 5,920 kc. signal from the multiplier 70 are mixed in second mixer 50, the difference frequency between these two signals is 5 megacycles. The output signal $f'_s$ therefore, is 5 megacycles, which is $n=2$ times the input frequency of $f_s$, which was the received carrier frequency of WWV. The frequency of the output wave is therefore related to the frequency of the input wave by a constant predetermined number $n$, and in view of the frequency difference there will be no feedback coupling to create instability.

In the operation of a circuit using the system of this invention, the predetermined number $n$ may be any number or any fraction of any number. In regard to the circuits described it is to be appreciated that various other types of similar function performing circuits could be substituted for those described in the preferred embodiments shown in the drawing. It is obvious that in regard to the oscillator circuit 60, and the amplifier circuit 30, any of the numerous variations of oscillators or amplifiers could be substituted in place of those shown in the figure. In regard to the mixer circuits 20 and 50 utilized for frequency conversion, several available frequency conversion devices could perform this function. One of the simplest frequency converters is one in which the two waves of oscillation are fed to the grid of a triode, with a tuned plate circuit for eliminating undesirable frequencies, however, many other types are available. The frequency multiplying circuits 40 and 70 also could be replaced by equivalent circuits. Any tube circuit which has a non-linear relation between grid voltage and plate current will have harmonics in its output current and can be coupled to a tuned circuit to gain a desired frequency multiple. High multiples can be attained by several stages of individual multiplying. In the event it is desired to effect a multiplication by a number less than one a frequency dividing circuit may be provided, this circuit may be chosen from any of a number of such function performing circuits among which are blocking oscillators, varieties of counter circuits, and multivibrators. It may be necessary to use both multiplying and dividing circuits to obtain the desired multiplying factor.

Figure 2:
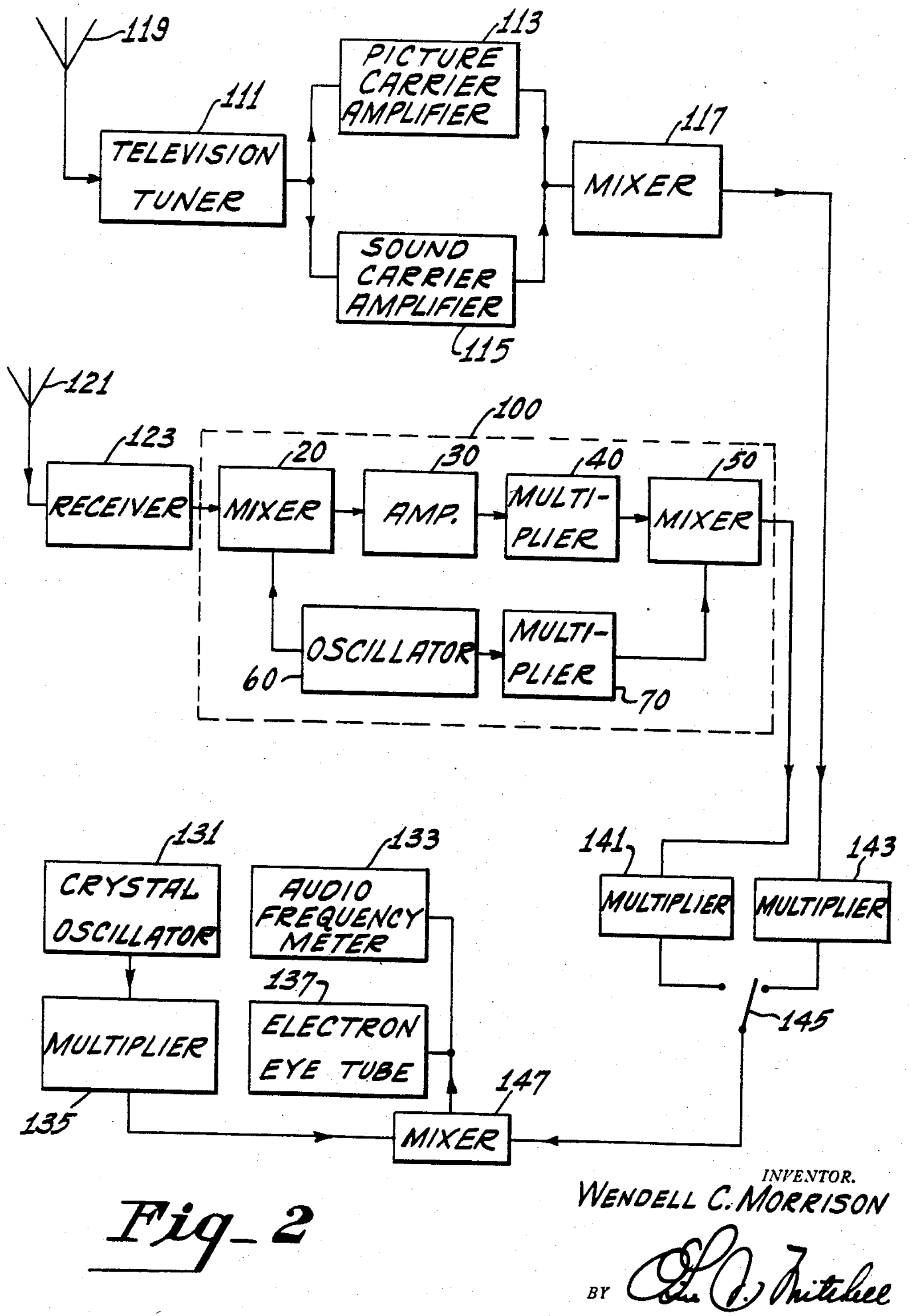
Figure 2 shows, in block diagram form, a television testing system.

Referring now to Figure 2 there is shown a television antenna 119 connected to operate with a television tuner 111, the combination being adapted to receive a television signal from a television broadcasting transmitter undergoing test. The television tuner 111 is then coupled to both a picture carrier amplifier 113 and a sound carrier amplifier 115 wherein the picture carrier and the sound carrier components of the composite television signal are separately amplified. The amplifiers 113 and 115 are in turn connected to a television mixer 117 wherein the picture carrier signal and the sound carrier signal are beat together. A test wave multiplier 143 is connected to the television mixer 117 for multiplying the frequency of a side band signal from the television mixer 117 to a predetermined theoretical frequency. Radio receiver 123 is adapted to receive by means of radio antenna 121 a stable frequency signal, such as a standard WWV transmission. This signal is then passed on to frequency conversion system 100. This frequency conversion system is the embodiment of the invention shown in Figure 1 and described above, all similar parts are similarly labeled. The output from frequency conversion system 100 is fed to a radio wave multiplier 141 wherein the frequency may be changed to a predetermined value. Crystal oscillator 131 is coupled to oscillator multiplier 135 wherein the frequency of oscillations from the oscillator 131 is changed to a theoretical predetermined value. Switch 145 is connected to comparison mixer 147 and enables the mixer 147 to be connected either to radio wave multiplier 141 or test wave multiplier 143. Comparison mixer 147 is also connected to oscillator multiplier 135. The output from comparison mixer 147 is coupled both to an electron eye tube 137 and audio frequency meter 133.

In the operation of the circuit represented by the above-described block diagram, the signal to be tested after passing through the television tuner 111 and having its separate picture carrier component frequency and sound carrier component frequency amplified separately in amplifiers 113 and 115 is recombined in television mixer 117 wherein signals having frequencies equal to the sum and the difference of upper and lower sidebands of the picture carrier signal frequency and the sound carrier signal frequency are produced. The difference frequency signal, for example, may be used in the test and will be referred to as a test wave. The test wave is multiplied to a theoretical predetermined frequency in the test wave multiplier 143. The multiplied test wave is then fed to mixer 147 where it may be compared in frequency with the signal from the oscillation multiplier 135. The frequencies of the two signals are multiplied such that they are theoretically equal and therefore any frequency difference will be detected and measured either in the electron eye tube 137 or the audio frequency meter 133. The particular device used depends upon whether or not the frequency variation is of a degree of a few cycles per second, in which case the electron eye tube 137 is used, or a greater frequency variation requiring the audio frequency meter 113. This comparison provides a means for determining the frequency and the stability of the difference frequency wave resulting from a combination of the picture carrier signal and the sound carrier signal. In the event the switch 145 is in a position to receive a signal from radio wave multiplier 141, the setup is then such as to check the accuracy of the crystal oscillator 131. An extremely stable frequency signal is received from the frequency conversion system 100, as explained in the discussion of Figure 1 and is applied to radio wave multiplier 141. The radio wave multiplier 141 multiplies this signal such that it will be theoretically equal to the multiplied signal from oscillator multiplier 135. A comparison can then be made in the comparison mixer 147 similar to the previous comparison made between the multiplied test wave and the signal from the oscillator multiplier 135. This comparison enables the operator to adjust the frequency of crystal oscillator 131 until it is operating at the proper frequency as indicated by a zero beat on the electron eye tube. In the use of the test equipment the operator would standardize the crystal oscillator 131 by using the WWV signal as a reference. The crystal oscillator 131 would then be used as a comparison for the beat frequency.

From the foregoing, it can be seen that applicant has provided an improved form of a frequency conversion system, for television testing purposes.

Having thus described the invention, what I claim as new and desire to secure by Letters Patent is:

1. A device for combining relatively stable oscillations with relatively unstable oscillations to produce oscillations the frequency of which is independent of variations in the frequency of said relatively unstable oscillations which comprises first combining means for mixing said relatively unstable oscillations and said relatively stable oscillations to produce first upper and lower beat frequency oscillations, first multiplying means coupled to said first combining means for multiplying the frequency of one of said beat frequency oscillations by a predetermined factor, second multiplying means coupled to receive said relatively unstable oscillations for multiplying the frequency of said unstable oscillations by said predetermined number, and second combining means coupled to both said multiplying means for combining said multiplied unstable oscillations with said multiplied one of said beat frequency oscillations to produce second upper and lower beat frequency oscillations whereby one of said second beat frequency oscillations is free from said unstable oscillations.

2. In a system for converting electrical waves of a first frequency to waves of a second frequency, said frequencies having a constant relationship equal to a predetermined number; a source of electrical waves of a third frequency; means combining the waves of said first frequency with the waves of said third frequency to produce waves of a fourth frequency; first frequency multiplying means multiplying the frequency of said waves of said fourth frequency by said predetermined number to produce waves of a fifth frequency; second frequency multiplying means multiplying the frequency of said waves of a third frequency by said predetermined number to produce waves of a sixth frequency; and means combining said waves of a sixth frequency with said waves of a fifth frequency to produce said waves of a second frequency.

3. In a system for converting electrical waves of a first frequency to waves of a second frequency, said frequencies having a constant relationship equal to a predetermined number; a source of electrical waves of a third frequency; means combining the waves of said first frequency with the waves of said third frequency to produce waves of a fourth frequency; amplifying means to amplify the waves of said fourth frequency; first frequency multiplying means multiplying the frequency of said waves of said fourth frequency by said predetermined number to produce waves of a fifth frequency; second frequency multiplying means multiplying the frequency of said waves of a third frequency by said predetermined number to produce waves of a sixth frequency; and means combining said waves of a sixth frequency with said waves of a fifth frequency to produce said waves of a second frequency.

4. In a frequency conversion system; an input circuit; a local oscillator; first frequency mixing means connected to said input circuit and said local oscillator for beating input oscillations with oscillations from said local oscillator, to produce a first resultant voltage; first filter means for eliminating voltage components from said resultant voltage which are not a frequency equal to the frequency of said local oscillator minus the frequency of said input oscillations; amplifying means acting on the frequency component of voltage preserved in said first filter; first frequency multiplying means connected to said amplifying means and multiplying the frequency of oscillations from said amplifying means by a predetermined factor; second frequency multiplying means connected to said local oscillator and multiplying the frequency of oscillations from said local oscillator by said predetermined factor; second frequency mixing means connected to said first frequency multiplying means and said second frequency multiplying means for beating oscillations from said first frequency multiplying means with oscillations from said second frequency multiplying means to produce a second resultant voltage; second filter means for eliminating voltage components from said second resultant voltage which are not of a frequency equal to said input oscillations frequency multiplied by said predetermined factor; and an output circuit connected to said second filter means.

5. A testing device for color television comprising television receiving means for receiving a television wave from a transmitter under test, first amplifier means connected to said receiving means for amplifying a picture carrier component of said television wave, second amplifying means connected to said receiving means for amplifying a sound carrier component of said television wave, a television mixer connected to both of said amplifying means for mixing said sound carrier component with said picture carrier component to produce a television test wave, a test wave multiplier connected to said television mixer to multiply the frequency of said television test wave, radio receiving means for receiving a stable frequency radio wave, a local oscillator, first radio mixing means connected to said radio receiving means and said local oscillator to produce a first resultant electrical wave, amplifying means connected to said first radio mixing means for amplifying a frequency component of said resultant electrical wave, first frequency multiplying means connected to said amplifying means and multiplying the frequency of oscillations from said amplifying means by a predetermined factor, second frequency multiplying means connected to said local oscillator and multiplying the frequency of oscillations from said local oscillator by a predetermined factor, second radio mixing means connected to said first frequency multiplying means and said second frequency multiplying means for beating oscillations from said first frequency multiplying means with oscillations from said second frequency multiplying means to produce a resultant voltage, a resultant voltage multiplier connected to said second radio mixing means, to multiply a frequency component of said resultant voltage, a crystal oscillator, an oscillator frequency multiplier connected to said crystal oscillator, a frequency comparing mixer connected to said crystal oscillator frequency multiplier and adapted to be connected to receive either said multiplied television test wave or the multiplied frequency component of said resultant voltage, frequency metering means connected to said frequency comparing mixer to determine the frequency of a sideband frequency wave resulting from two waves being combined in said frequency comparing mixer.

References Cited in the file of this patent

UNITED STATES PATENTS

| | | |
|---|---|---|
| 2,505,043 | Quanella | Apr. 25, 1950 |
| 2,507,178 | Usselman | May 9, 1950 |
| 2,558,790 | Smith | July 3, 1951 |
| 2,629,818 | Bailey | Feb. 24, 1953 |